Feb. 23, 1943. G. A. TINNERMAN 2,312,134
ADJUSTABLE CONNECTING DEVICE OR SIMILAR FASTENER
Filed Sept. 13, 1940
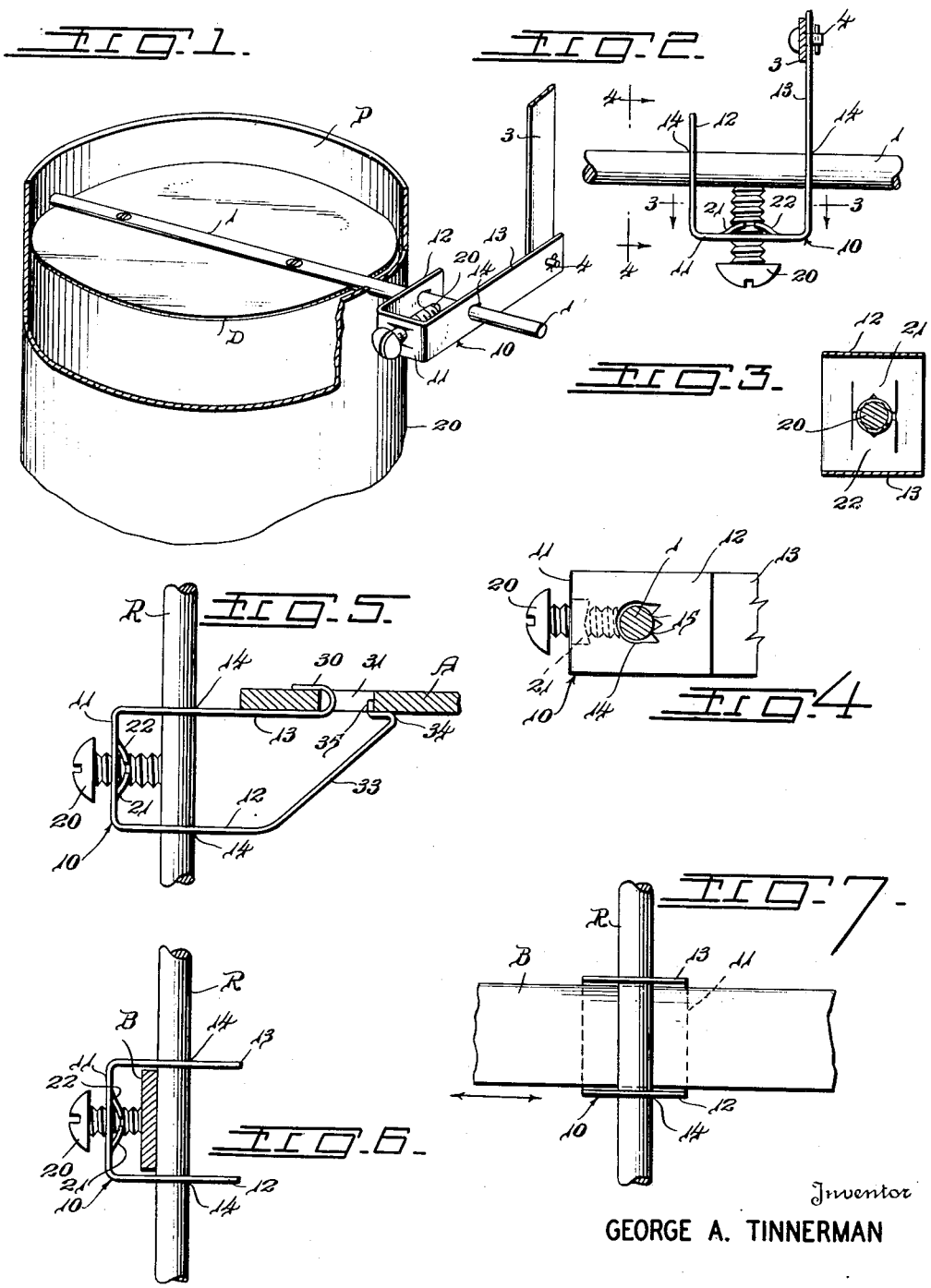
Inventor
GEORGE A. TINNERMAN
By H. G. Lombard
Attorney Patented Feb. 23, 1943

2,312,134

UNITED STATES PATENT OFFICE 2,312,134

ADJUSTABLE CONNECTING DEVICE OR SIMILAR FASTENER

George A. Tinnerman, Cleveland, Ohio, assignor to Tinnerman Products, Inc., Cleveland, Ohio, a corporation of Ohio Application September 13, 1940, Serial No. 356,707

3 Claims. (Cl. 287—52.02)

This invention relates to an improved form of fastening device having a clamping action with a shaft, rod, or the like, in a manner to provide an easily and quickly adjustable connection of general utility adapted for use in a wide range and variety of installations.

More particularly, this invention deals with an improved fastener construction designed for clamping action with a shaft, rod, or the like, to provide an adjustable connection in which a cooperating part or member may be adjustably secured with respect thereto for relative movement therewith or otherwise fixedly secured or supported in an installation by the firm, rigid connection of the fastener with said shaft, rod, or the like.

A principal object of the invention is to provide a simple, inexpensive fastener in the form of a connecting device of this character comprising a generally U-shaped, metallic structure having spaced arms provided with apertures receiving the shaft, rod, or the like, and clamping the same under the thrust or force of a set screw or other threaded fastening device cooperating therewith.

Another object of the invention is for the provision of such a generally U-shaped, sheet metal fastener having means in the base or web portion thereof for threadedly engaging the set screw and otherwise providing a tensioned, thread locking action therewith in any setting or position of adjustment of the sheet metal fastener in connected engagement with the shaft, rod, or the like.

A further, more specific object of the invention is to provide a fastener of the character aforesaid designed for adjustable clamping engagement with a rod, shaft, or the like, in a manner to serve as a substantial crank or lever mechanism for actuating the same or for operating a member associated therewith.

Another, more specific object contemplates the provision of the fastener of the present invention as a means for adjustably and removably supporting an article with respect to the rod, shaft or the like to which it is connected and capable of adjustment in either a horizontal or vertical direction in an installation.

A still further object is to provide such a fastener as designed for connecting cooperating parts disposed generally at right angles to each other in the manner of a two-way adjustable clamp, and further, in this relation, as a connecting device for fixedly and rigidly securing a generally flat part or member to a round shaft or rod member and capable of adjustment longitudinally of either of said members.

Further objects and advantages and other new and useful features in the construction, arrangement and general combination of parts of the invention will be apparent to those skilled in the art as a description thereof proceeds with reference to the accompanying drawing, for purposes of illustration but not of limitation, in which like reference characters designate like parts throughout the same, and in which:

Fig. 1 is a perspective view illustrating one embodiment of the improved fastener of the invention as employed in the manner of an adjustable connecting lever in a damper control apparatus, for example, or a similar type of valve mechanism;

Fig. 2 is a close-up view of the fastener appearing in Fig. 1 and showing the same in edge elevation as connected to the associated shaft member;

Fig. 3 is a sectional view taken on line 3—3 of Fig. 2, looking in the direction of the arrows and showing the base of the fastener in plan;

Fig. 4 is a sectional view of Fig. 2 along line 4—4 looking in the direction of the arrows;

Fig. 5 represents another embodiment of the invention in which the fastener is constructed for use as an adjustable support for a removable panel member or like part, represented in section;

Fig. 6 shows a further embodiment of the invention wherein the fastener is employed as an adjustable clamp for securing a generally flat element to a round rod member or the like; and, Fig. 7 is a side elevational view as seen from the right of Fig. 6.

The fastening device of the present invention is one of general utility for providing a simple, inexpensive and easily installed connecting means adapted for fixed, rigid, connected engagement with a shaft, rod, or the like, in a manner whereby an associated part may be secured with respect to said shaft for relative movement therewith or otherwise firmly secured or supported in an installation but capable of both vertical and horizontal adjustment as may be necessary or desirable. It will thus be appreciated that the present invention is one which may be advantageously employed in a wide range and variety of installations as a simple, inexpensive and highly practical form of adjustable connecting means.

For purposes of illustration, one important application of the improved fastener of the present invention is disclosed in Figs. 1 to 4 inclusive as provided for use in the manner of an adjustable crank or operating lever in a damper control apparatus, for example, or similar type of valve mechanism actuated by a remote control linkage, or the like. In Fig. 1 there is represented a general organization of this character wherein a pipe P, or the like, is provided with a damper or similar valve D attached, in any suitable way, to a rotatable transverse supporting shaft 1, for horizontal oscillating motion in said pipe P. Said shaft 1 is supported at diametric points in said pipe P with one end extending therethrough and providing a laterally projecting shaft portion to which is secured the connecting device of the present invention, designated generally 10. At a point removed from said shaft, a link 3 or similar element is pivotally secured to an arm or extension of said connecting device in any suitable way as by a stud and cotter pin 4, such link 3 forming a part of a remote control linkage, or the like, for actuating the mechanism just described.

As best seen in Figs. 1 and 2, the fastener or connecting device 10 is provided in the form of a generally U-shaped device comprising a base or web portion 11 between a pair of spaced arms 12, 13. If desired, one of said arms 13, may be somewhat longer than the other to define an extension to which the link 3 is connected, as aforesaid. While the fastening device 10 may be provided in various ways in the form of a casting or machined part, the present invention contemplates such a device as constructed in the simplest and cheapest manner from a small, inexpensive blank or stamping of any suitable sheet metal material, preferably of spring metal or of metal having spring-like characteristics such as cold rolled steel. In this respect, it will be recognized that though the device may be formed from sheet metal sections of various outlines, of course, the same is most advantageously provided from a simple, generally rectangular stamping which is readily obtained from ordinary sheet metal strip stock with little or no waste of material in providing a device capable of economical quantity production and relatively low cost.

As shown in Fig. 4, an aperture 14 is provided in each of said arms 12, 13, at points spaced from the base or web portion 11 of the fastener. Said openings 14 are in suitable alignment for receiving the shaft 1 in a direction generally normal to said arms 12, 13, and substantially parallel to said base portion 11 of the fastener, as illustrated in Fig. 2. On portions of the marginal edges of said apertures 14, there are preferably provided teeth 15, prongs, serrations or similar means having their points extending toward the base 11 of the fastener in a direction to positively engage, become embedded or otherwise anchored to said shaft 1 under a clamping force or thrust exerted thereon normal to said shaft. While normally under such clamping force, the plain marginal edges of said apertures 14 are capable of frictionally and grippingly engaging the shaft with sufficient tightness to hold the fastener fixedly and rigidly secured thereon, the teeth 15 serve to provide an added positive lock preventing any possible slippage, loosening or displacement of the fastener in a relative axial as well as relative rotative motion on said shaft, as when employed for the purpose of transmitting or receiving a torque or turning force.

For supplying the clamping force which urges the marginal edges of apertures 14, or the teeth 15 provided thereon, to positive engagement with the shaft, a set screw 20 or the like, is provided for threaded engagement with thread engaging means formed on or carried by the base or web portion 11 of the fastener in a manner to permit said set screw to be advanced in a direction normal to said shaft to positive engagement therewith substantially as shown in Fig. 2. While such thread engaging means may be provided in the manner of a separate threaded nut spot-welded, riveted or otherwise attached to said base or web portion 11 of the fastener, such arrangements are relatively expensive and the cost of the fasteners prohibitive in many cases because of the added step in manufacture required in addition to a separate assembling operation and the cost of a lock nut or lock washer for providing the set screw with means preventing loosening or displacement thereof from any setting or operative clamping position in an installation.

In a preferred construction, the above noted objections are obviated and most advantageously eliminated in the provision of the fastener in a unitary, one-piece, sheet metal product in which thread engaging means for the set screw are provided on the base or web portion 11 of the fastener in the manner of integral cooperating tongue elements 21, 22, or the like, defining a thread or a thread opening for threadedly engaging the thread of the set screw 20, as illustrated in Fig. 2. Referring to Fig. 3, it will be understood that such thread engaging elements are best provided from the material of the base 11 of the fastener by an aperture intermediate spaced parallel slits forming the cooperating tongues 21, 22, having a space between the extremities thereof which define the desired thread or thread opening for threadedly engaging the set screw. Said tongue elements 21, 22, otherwise are formed to project inwardly of said base portion 11 out of the plane thereof, as shown in Fig. 2, and bent intermediate their lengths in a substantial ogee formation to provide for the maximum strength therein to withstand the tightening action of the set screw 20 as it is advanced to positive clamping engagement with the shaft.

Said thread engaging means may be pressed, stamped, extruded or otherwise provided on the base 11 of the fastener in any suitable form or construction so long as the same threadedly engage with the thread of the set screw 20, and, in this relation, the present invention fully contemplates the provision of such thread engaging means in various other related forms as in the manner of a substantial perforated protuberance which is pressed from the sheet metal and shaped to provide a helical thread or otherwise has the walls thereof tapped to provide a plurality of threads for threadedly engaging the set screw. However, it has been found that such thread engaging means prepared in the form of cooperating, yieldable tongues, as shown, are the most efficient and the most practical in that they are possessed of unusual inherent strength and will not collapse or pull through when the set screw is tightened nor loosen under continuous strain and vibration in the installation. This takes place by reason of the fact that the sheet metal material from which such tongues 21, 22, are formed is of less thickness than the pitch or spacing of the threads of the bolt or screw, wherefore such tongues tend, more effectively, to move toward each other and dig into the grooves intermediate adjacent threads of the set screw when tightened therewith and otherwise become embedded in the root diameter thereof in locked, frictional fastening engagement therewith in applied fastening position. In the present example, such tongues 21, 22, are shown as extending out of the plane of base 11 in substantial ogee formation and provided preferably with notched extremities, Fig. 3, forming substantial biting jaws designed to cut into the root diameter of the set screw and adjacent thread surfaces thereon in positive locking relation therewith in the most effective manner. There is thus eliminated any necessity for a separate locking means such as a lock nut or lock washer and this, in mass production, not only involves a considerable saving in the cost of such locking devices but also the expense and labor involved in the tedious, time-consuming assembling operations and other steps in manufacture which such devices require. It is to be understood, however, that the present invention is not limited in any manner or form to this construction of the thread engaging means 21, 22 but rather, comprehends also, various other forms of such tongues or equivalent thread engaging means.

In operation and use, the fastener or connecting device 10 of the present invention prepared substantially in the manner aforesaid, is applied to the projecting portion of shaft 1 by slipping the same over the end of said shaft through the aligned apertures 14 in the arms 12, 13 thereof. The set screw 20 may be threadedly engaged with the thread engaging means 21, 22 of the fastener either before or after the same is thus slipped over the shaft and located in operative position thereon, whereupon said set screw is advanced in a direction normal to said shaft to positive clamping engagement therewith substantially as shown in Fig. 2. As illustrated in Fig. 1, the link 3, or equivalent means forming part of a remote control mechanism is pivotally secured to an extension on arm 13, for example, of the fastener, whereupon said fastener is adapted to serve as a lever or crank device, in response to movement of said link 3, to operate and selectively position the damper D or similar member mounted for turning movement in an installation.

In this respect, the fastener is disposed in positive locked relation with the shaft 1, against any possible slippage or displacement by virtue of the combined clamping force of the set screw 20 therewith and the action of the jaws defined by the shaft receiving apertures 14 in arms 12, 13, and the marginal serrations or teeth 15 which are urged into biting engagement with said shaft under such clamping force of the set screw 20. In any such position, the set screw itself is held in clamping engagement with the shaft and locked against loosening and reverse rotation toward untightening by the thread locking action therewith of the integral, resilient, tongues 21, 22, or similar thread engaging means, as aforesaid.

This thread locking action is not such as to cause a permanent distortion or deformation of the tongues 21, 22, or the like, inasmuch as the sheet metal material of the fastener from which such thread engaging means are formed is preferably of spring metal or other metal of sufficient hardness to withstand the tightening action of the set screw and the tensioning thread locking engagement thereof with said set screw in the extreme limit of tightening of the same. The set screw 20 may therefore be loosened and tightened as often as necessary or desirable without danger of damaging or mutilating the thread engaging elements 21, 22, thereof, and thus, the fastener may be readily disassociated from the shaft and resecured in a new setting or position of adjustment with equal effectiveness even after an extended period of service and use. Accordingly, in the installation represented in Fig. 1, it will be appreciated that the fastener 10 is readily adapted for either axial or rotative adjustment with respect to the shaft 1 simply by loosening the set screw 20 and moving the fastener 10 relative to said shaft as necessary to dispose the same in desired operative position with reference to the damper D, or other member operated by said shaft, and the link 3 or similar mechanism for actuating the same. The set screw is then tightened in the new setting or adjusted position of the fastener in a manner whereby the entire adjustment is easily and quickly accomplished in a minimum of time and effort and without disassembling or otherwise disturbing the operative position of any of the parts connected or other mechanism associated therewith.

Fig. 5 illustrates a further embodiment of the invention wherein the fastener 10 is of the same general character as that described with reference to Figs. 1 to 4 inclusive and is connected to the rod R, post, or similar supporting shaft to serve in the manner of an adjustable support for suspending or mounting a part A such as a panel or shelf of a cabinet structure, or the like, in vertically or horizontally adjustable relation to said rod R. To this end, an extension on the arm 13, for example, is provided with a bent portion defining a substantial finger, hook or equivalent means 30 extending through an assembling opening 31 in said part A to embrace said part on its opposite faces and thereby serve to secure the same in generally perpendicular relation to said rod R. On the other arm 12 there is provided an inclined extension or spring arm 33 having a bent portion defining a shoulder 34 and a lug 35 of a reduced size suitable to enter the assembling opening. Said shoulder 34 is designed to support the part A in cooperation with the hook portion 30 on the arm 13 while said lug 35 engages an adjacent wall of said assembling opening 31 to prevent said hook 30 from becoming accidentally or unintentionally disassociated therefrom.

To secure the part A to the fastener, the free end of said hook 30 is inserted into said assembling opening 31 and the spring arm 33 suitably flexed as necessary to permit said part A to be slid longitudinally to a position in which said hook 30 embraces opposite faces thereof adjacent the assembling opening 31 therein, substantially as shown. In this position, said spring arm 33 is manipulated to snap the lug 35 into the assembling opening 31 in engagement with the adjacent wall thereof in a manner to prevent movement of said part A in a direction toward disengagement from the hook 30. Removal of part A from the fastener is easily and quickly accomplished in a reversal of the foregoing procedure or by sliding said part A against the tension of spring arm 33 in a direction to disengage the hook 30 therefrom through the opening 31 therein, whereupon said part A may be lifted free of said hook 30 and the lug 35, and thereby removed from attached relation with the fastener. In the completed installation represented in Fig. 5, the part A may be readily adjusted either vertically or horizontally with respect to said supporting rod R, simply by loosening the set screw 20 to permit adjusting movement of the fastener and part A attached thereto to any desired new location, after which the set screw is tightened to fixedly and rigidly secure the fastener to the rod substantially in the manner described with reference to the embodiment of Figs. 1 to 4 inclusive.

Figs. 6 and 7 show a further embodiment of the invention wherein the fastener 10 is employed in the manner of an adjustable clamp to secure a bracket B, or like member directly to the supporting rod R, substantially as shown in Fig. 6. The fastener 10 is constructed in the general U-shaped form described, to provide the arms 12, 13, in connected engagement with the rod R, and receiving in the space therebetween said bracket B or similar connecting tongue element, or the like, of a cooperating part. The bracket B is firmly and rigidly clamped directly to the rod R by the leading end of the set screw 20, and in this relation, the thrust incident to tightening said set screw, causes the teeth or serrated jaws 15, Fig. 4, bordering the rod receiving apertures 14 in said arms 12, 13, to become embedded in biting engagement with said rod R thereby maintaining the fastener against any possible slippage or displacement thereon in applied fastening position, substantially as described with reference to Figs. 1 to 4 inclusive. This arrangement is particularly useful as a fastening means of general utility for fixedly and rigidly connecting a flat part to a round rod member, or the like, and in perpendicular or other angular relationship thereto but capable of easy and quick adjustment either vertically or horizontally of said rod R, with the bracket B being also adjustable in a lengthwise direction with respect to said rod, as indicated by the arrow in Fig. 7.

While the invention has been described in detail with specific examples, such examples are intended as illustrations only, since it will be apparent to those skilled in the art that other modifications in the construction, arrangement and general combination of parts thereof may be devised without departing from the spirit of the invention. The present embodiments are therefore to be considered in all respects as illustrative and not restrictive, the scope of the invention being indicated by the appended claims rather than by the foregoing description, with all changes falling within the scope, meaning and range of equivalency of the claims intended to be embraced therein.

Reference is made to my divisional application Serial No. 467,309, filed November 30, 1942, for claims relating to the U-shaped fastener having apertured arms and a clamping screw threadingly carried by the intermediate region of the fastener and adapted to bear against a rod passing through the arms.

What is claimed is:

1. A fastener for connecting an apertured part to a rod, shaft, or the like, said fastener comprising a sheet metal body having a base and bent portions defining a pair of spaced arms having free ends and extending in the same general direction from said base, said arms having aligned apertures for receiving said shaft or rod passed therethrough, thread engaging means on said base, a threaded fastening threadedly engaged with said thread engaging means and adapted to engage said shaft or rod, securing means provided adjacent the free ends of said arms of the fastener for engaging said part through the aperture therein to connect said part to said rod or shaft.

2. A fastener for connecting an apertured part to a rod, shaft, or the like, said fastener comprising a sheet metal body having a base and bent portions defining a pair of spaced arms having free ends and extending in the same general direction from said base, said arms having aligned apertures for receiving said shaft or rod passed therethrough, thread engaging means provided on said base, a threaded fastening threadedly engaged with said thread engaging means and adapted to engage said shaft or rod, a hook provided adjacent the free end of one of said arms of the fastener for engaging said part adjacent the aperture therein to connect the same to said rod or shaft, and means on the other arm engaging the other side of said aperture to cooperate with said hook in connected engagement with said part.

3. A fastener for connecting an apertured part to a rod, shaft, or the like, said fastener comprising a sheet metal body having a base and bent portions defining a pair of spaced arms having free ends and extending in the same general direction from said base, said arms having apertures for receiving said rod or shaft passed therethrough, thread engaging means provided on said base, a threaded fastening threadedly engaged with said thread engaging means and adapted to engage said rod or shaft, a hook or the like, provided adjacent the free end of one of said arms of the fastener for clasping opposite sides of said part through the aperture therein to connect the same to said rod or shaft, and means on the other arm engaging the other side of said aperture to cooperate with said hook in retaining the same in securing engagement with said part.

GEORGE A. TINNERMAN.